United States Patent [19]

Oda et al.

[11] 4,314,291
[45] Feb. 2, 1982

[54] SELF-COMPENSATING DEVICE FOR A MAGNETIC DISC APPARATUS

[75] Inventors: Yasutaka Oda; Hiromi Hamaoka, both of Oume, Japan

[73] Assignee: Tokyo Shibaura Denki Kabushiki Kaisha, Kawasaki, Japan

[21] Appl. No.: 90,264

[22] Filed: Nov. 1, 1979

[30] Foreign Application Priority Data

Nov. 8, 1978 [JP] Japan .................... 53-136655

[51] Int. Cl.³ ................ G11B 21/08; G11B 5/55
[52] U.S. Cl. ............................ 360/78; 360/77; 360/106
[58] Field of Search ................... 360/77-78, 360/70, 106, 107, 131, 135

[56] References Cited

U.S. PATENT DOCUMENTS

| | | | |
|---|---|---|---|
| 3,699,555 | 10/1972 | DuVall | 360/78 |
| 3,936,876 | 2/1976 | Taylor | 360/78 |
| 4,068,269 | 1/1978 | Commander et al. | 360/78 |
| 4,096,534 | 6/1978 | Brownback et al. | 360/78 |
| 4,133,011 | 1/1979 | Kurzweil, Jr. | 360/78 |
| 4,238,809 | 12/1980 | Fujiki | 360/131 |

*Primary Examiner*—John H. Wolff
*Attorney, Agent, or Firm*—Kenyon & Kenyon

[57] ABSTRACT

Disclosed is a self-compensating device for a magnetic disc apparatus with a velocity servo system in which a change of the characteristic of an actuator for positioning a read/write transducer is automatically compensated by the combination of a control means and a compensator. While supplying a given velocity command signal to the velocity servo system, the control means measures the motion of the transducer by using a track detector and adjusts the compensator on the basis of the result of the measurement.

9 Claims, 4 Drawing Figures

SELF-COMPENSATING DEVICE FOR A MAGNETIC DISC APPARATUS

BACKGROUND OF THE INVENTION

This invention relates to a magnetic disc apparatus, and more particularly, to a self-compensating device for a magnetic disc apparatus which can automatically compensate for a change of the characteristic of an actuator for positioning a magnetoelectric transducer.

The magnetic disc apparatus employs at least one rotatable magnetic disc as a recording medium. The recording surface of the disc has a number of data tracks concentrically disposed thereon. Data is serially recorded along the respective tracks. Provision of a read/write transducer for each track is effective for reduction of the access time but uneconomical. Therefore, the magnetic disc apparatus is usually provided with at most each or several transducers for one recording surface, each transducer being used for writing data into or reading out data from a plurality of the tracks.

A magnetic disc apparatus of the above type is provided with a transducer positioning mechanism to reciprocally move the transducer across the data tracks for positioning the transducer above the desired or target track. The transducer positioning mechanism is generally provided with a reciprocally movable carriage, and an actuator for actuating the carriage.

When the velocity of the transducer is too low, the access time of course increases. Conversely, when the velocity is too high, the access time also increases. A velocity which is too high makes it difficult to stop the transducer within the distance from the transducer to the target track, so that the transducer often moves beyond the target track. Therefore, in order to accurately position the transducer at and above the target track in the shortest time, it is necessary to move the transducer at a velocity selected corresponding to the distance from the transducer to the target track. For this reason, most of the magnetic disc apparatus currently used are each provided with a velocity servo system to keep the transducer velocity at a given target velocity.

The velocity servo system is usually comprised of a velocity command signal generator for determining a proper velocity (target velocity) in accordance with the distance from the transducer to the target track, a velocity detector for detecting an actual velocity (real velocity) of the transducer, a velocity error detector for detecting a difference between the target velocity and the real velocity, and an actuator for accelerating or decelerating the transducer in response to the output signal of the velocity error detector.

In case an actuator of the velocity servo system has an unexpected characteristic such as a current-acceleration characteristic, the access time increases or the operation of the velocity servo system becomes unstable. In order to eliminate such defects, an apparatus to electrically compensate for a change of the characteristic of the actuator and thus for coping with a change of the characteristic of the actuator has been used in the velocity servo system.

Conventionally, a compensator of the above-described type is manually adjusted, and adjustment is complicated and troublesome. This leads to inefficiency in the manufacturing of the magnetic disc apparatus. Further, the conventional compensating method can not easily compensate for a change of the characteristic of the actuator arising from some causes occurring after the system is in operation such as aging of the actuator or replacement of the actuator.

SUMMARY OF THE INVENTION

Accordingly, the primary object of the invention is to provide a self-compensating device for a magnetic disc apparatus for automatically compensating for a change of the characteristic of an actuator for positioning the transducer.

Another object of the invention is to provide a self-compensating device for a magnetic disc apparatus for automatically measuring a characteristic of an actuator.

Still another object of the invention is to provide a self-compensating device for a magnetic disc apparatus for automatically adjusting a compensator provided to compensate for a change of the characteristic of an actuator.

According to the present invention, there is provided a self-compensating device for a magnetic disc apparatus comprising: a magnetic disc means with a number of data tracks concentrically arranged on the surface thereof; a read/write transducer means for reading out data from or writing data into the data tracks; an actuator means for reciprocally moving the transducer means across the data tracks; a position detector means for producing a pulse every time the transducer means moves a given distance; a velocity detector means for detecting the velocity of the transducer means to produce a velocity signal; a velocity error detecting means responsive to the velocity signal and a velocity command signal to produce a velocity error signal; a compensator means responsive to the velocity error signal to produce a compensated velocity error signal; a drive means responsive to the compensated velocity error signal to accelerate or decelerate the actuator means so as to make the compensated velocity error signal small; and a control means which observes the output pulse of the position detector means, while the control means supplies a given velocity command signal to the velocity error detector means, and which adjusts the compensator means on the basis of the result of the observation.

The invention will be better understood from the following description taken in connection with the accompanying drawings, in which:

DETAILED DESCRIPTION OF THE PREFERRED EMBODIMENT

I. Velocity Servo System

Figure 1:
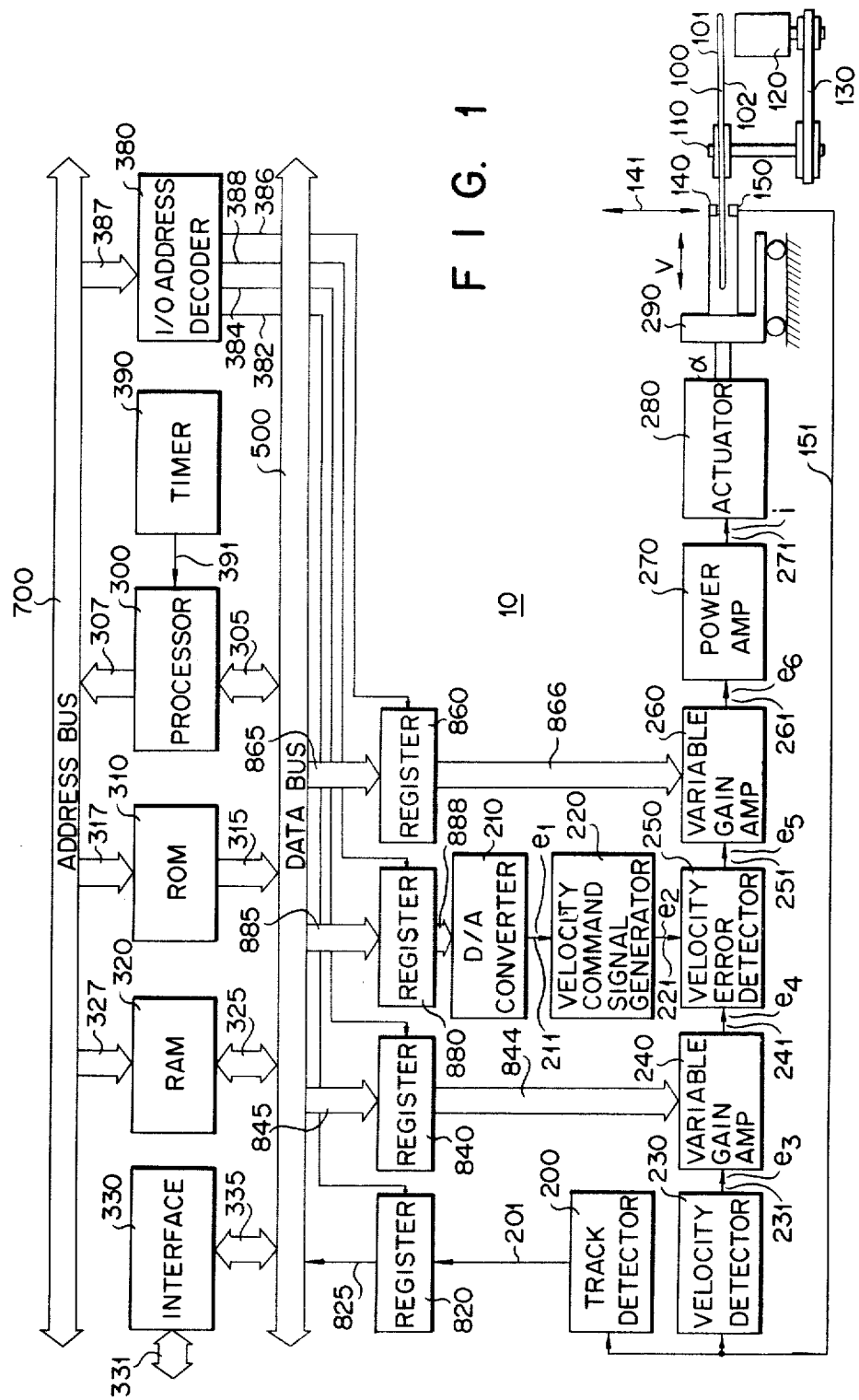
FIG. 1 shows a block diagram of a self-compensating device for a magnetic disc apparatus which is an embodiment according to the invention.

FIG. 1 shows a block diagram of an embodiment of a self-compensating device 10 for a magnetic disc apparatus according to the invention. As shown, a magnetic disc 100 is mounted to a spindle 110. The combination of a motor 120 and a belt-pulley transmission mechanism 130 drives the spindle 110 and the magnetic disc 100 to rotate them. A number of data tracks are concentrically arranged on the upper surface 101 of the magnetic disc 100. A read/write transducer 140, disposed facing the upper surface 101 of the magnetic disc 100, reads out data from or writes data into the data tracks. On the lower surface 102 of the magnetic disc 100, known servo tracks are concentrically arranged corresponding to the data tracks arranged on the upper surface 101. A servo transducer 150, facing the lower surface 102 of the magnetic disc 100, reads out a servo signal from the servo tracks.

The combination of the read/write transducer 140 and the servo transducer 150 is coupled with a carriage 290 further coupled with an actuator 280 and reciprocally movable in the radial direction of the magnetic disc 100. The actuator 280 drives the carriage 290 to position the read/write transducer 140 at and above a desired data track. An acceleration $\alpha$ of the carriage 290 bearing and carrying the read/write transducer 140 and the servo transducer 150 and an input current i into the actuator 280, can be approximately related as follows:

$$\alpha = K_i \cdot i \quad (1)$$

where Ki is a coefficient called a "current-acceleration converting coefficient" which is slightly different among individual actuators 280 used.

The output terminal 141 of the read/write transducer 140 is connected to the read/write circuit (not shown). A servo signal appearing at the output terminal 151 of the servo transducer 150 is supplied to a track detector (position detector) 200 and the velocity detector 230. The track detector 200 responds to a servo signal to provide track pulses on the output terminal 201. Each track pulse is characterized by a short pulse width and is produced every time that the transducer 140 crosses a specific position (for example, a center of each track) on a respective track.

The velocity detector 230 responds to the servo signal to provide a velocity signal at the output terminal 231. A velocity detector 230 of this type is discussed in detail in the copending U.S. Patent Application Ser. No. 17,618, filed Mar. 5, 1979, now U.S. Pat. No. 4,238,809 issued Dec. 9, 1980, and entitled "SERVO TRACK CONFIGURATION FOR MAGNETIC DISK APPARATUS". It is understood that the velocity detector 230 responsive to the servo signal to produce a velocity signal may be substituted by a velocity detector of another type. For example, a velocity detecting including a velocity detecting coil associatively coupled with the actuator 280 may be employed. In either case, the velocity signal represents the velocity of the carriage 290 with the read/write transducer 140 and the servo transducer 150. Therefore, between the velocity v of the carriage 290 and a voltage $e_3$ of the velocity signal, the following relation holds.

$$e_3 = K_v \cdot v \quad (2)$$

In equation (2), Kv indicates a coefficient called "the velocity-voltage converting coefficient", which is slightly different among individual velocity detectors 230 used. The velocity signal is applied to a first compensator, or a variable gain amplifier 240.

The variable gain amplifier 240 amplifies the velocity signal to provide a compensated velocity signal on its output terminal 241. Hence, a voltage $e_4$ of the compensated velocity signal is given by the following equation.

$$e_4 = g_4 \cdot e_3 = g_4 \cdot K_v \cdot v \quad (3)$$

In the above equation, the gain $g_4$ of the amplifier 240 is variable.

The value of the "velocity-voltage coefficient Kv" of the velocity detector 230 is different among the individual velocity detectors 230 used. Therefore, the coefficient Kv does not always have a precisely estimated value. However, since the gain $g_4$ of the amplifier 240 is adjusted through the self-compensating operation to be described later, the resultant coefficient ($g_4 \cdot K_v$) is kept substantially at a fixed value $K_1$. The compensated velocity signal is supplied to a velocity error detector 250.

The velocity error detector 250 responds to the compensated velocity signal and a velocity command signal to be described later to provide a velocity error signal on its output terminal 251. The velocity error signal indicates a difference between a target velocity represented by the velocity command signal and a real velocity represented by the compensated velocity signal. Accordingly, among the voltage $e_5$ of the velocity error signal, the voltage $e_2$ of the velocity command signal and the voltage $e_4$ of the compensated velocity signal, the following relation holds.

$$e_5 = G_5 \cdot (e_2 - e_4) \quad (4)$$

In the above equation, the gain $G_5$ of the velocity error detector 250 is constant. The velocity error signal is applied to a second compensator, or a variable gain amplifier 260.

The variable gain amplifier 260 amplifies the velocity error signal to produce a compensated velocity error signal at the output terminal 261. Therefore, the voltage $e_6$ of the compensated velocity error signal is expressed by the following relation.

$$e_6 = g_6 \cdot e_5 = g_6 \cdot G_5 \cdot (e_2 - e_4) \quad (5)$$

In the above equation, the gain $g_6$ of the amplifier 260 is variable. The compensated velocity error signal is applied to a power amplifier 270.

The power amplifier 270 feeds a drive current i proportional to the voltage $e_6$ of the compensated velocity error signal to the actuator 280, through its output terminal 271. When the absolute value $|e_6|$ of the voltage $e_6$ exceeds a given value $e_{6\,max}$, the absolute value $|i|$ of the drive current i does not increase further. Therefore, the drive current i is given as follows:

when $|e_6| \leq e_{6\,max}$ $$i = G_7 \cdot e_6 = G_7 \cdot g_6 \cdot G_5 \cdot (e_2 - e_4) \quad (6\text{-}1)$$

when $|e_6| > e_{6\,max}$ $$i = \frac{e_6}{|e_6|} \cdot G_7 \cdot e_{6\,max} \quad (6\text{-}2)$$

In the above equations (6-1) and (6-2), the gain $G_7$ of the power amplifier 270 is constant. The acceleration $\alpha$ of the carriage 290 driven by the actuator 280 is expressed by the following relations:

when $|e_6| \leq e_{6\,max}$ $$\alpha = Ki \cdot i = Ki \cdot G_7 \cdot g_6 \cdot G_5 \cdot (e_2 - e_4) \tag{7-1}$$

when $|e_6| > e_{6\,max}$ $$\alpha = Ki \cdot i = Ki \cdot \frac{e_6}{|e_6|} \cdot G_7 \cdot e_{6\,max}. \tag{7-2}$$

In the above equations (7-1) and (7-2), the current-acceleration converting coefficient Ki of the actuator 280 depends on the different actuators 280. Accordingly, the coefficient Ki does not always have an accurately estimated value. However, since the gain $g_6$ of the amplifier 260 is adjusted through the self-compensating operation to be described later, the resultant coefficient $(Ki \cdot G_7 \cdot g_6 \cdot G_5)$ in the equation (7-1) is kept substantially at the fixed value $K_2$. Incidentally, the amplifier 260 may be formed integral with the velocity error detector 250 or the power amplifier 270.

II. Variable Gain Amplifier (Compensator)

Figure 2:
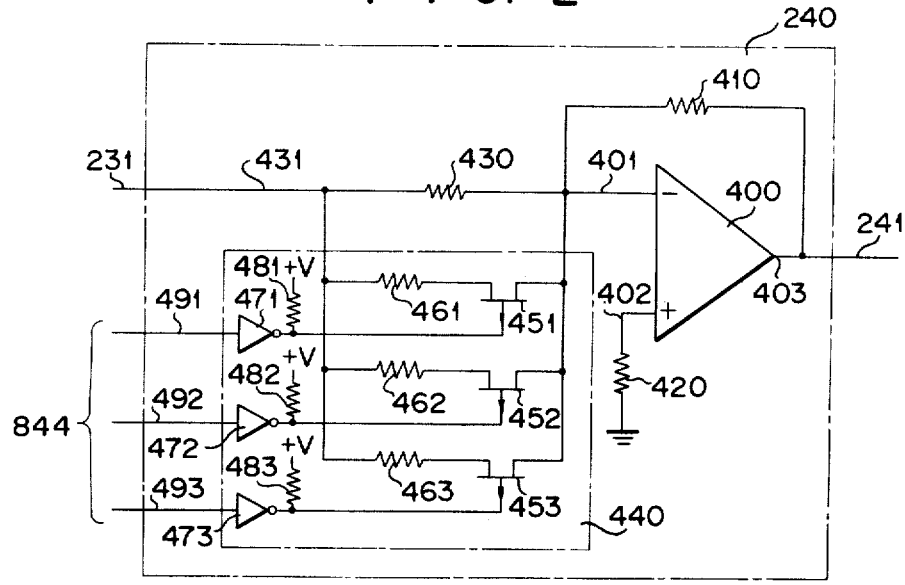
FIG. 2 shows a circuit diagram of a first compensator (a variable gain amplifier)

FIG. 2 shows a circuit construction of the first compensator, or the variable gain amplifier 240, used in the embodiment. As shown, the amplifier 240 is comprised of an operational amplifier 400, resistors 410, 420, 430, and a gain selector 440.

The operational amplifier 400 is comprised of an inverting input terminal 401, a non-inverting input terminal 402, and an output terminal 403. The output terminal 403 of the operational amplifier 400 also serves as the output terminal 241 of the amplifier 240. The resistor 410 is connected between the output terminal 403 and the inverting input terminal 401. The resistor 420 is connected at one end to the non-inverting input terminal 402 and at the other end to ground. One end of the resistor 430 is connected to the inverting input terminal 401. The other end 431 of the resistor 430 serves as an input terminal of the amplifier 240.

The gain selecting circuit 440 includes field effect transistors (FET) 451 to 453 and inverters 471 to 473. The drains of the field effect transistors 451 to 453 are commonly connected to the inverting input terminal 401. Moreover, the sources of the field effect transistors 451 to 453 are connected to one end of the resistors 461 to 463, respectively. The other ends of the resistors 461 to 463 are commonly connected to the input terminal 431. The gates of the field effect transistors 451 to 453 are connected to the output terminals of the inverters 471 to 473, respectively. Between the output terminals of the inverters 471 to 473 and the power source are connected pull-up resistors 481 to 483, respectively. The input terminals 491 to 493 of the inverters 471 to 473 are the gain control terminals of the amplifier 240. The gain $g_4$ of the amplifier 240 constructed as mentioned above varies in eight steps in accordance with combinations of voltage levels to be applied to the gain control terminals 491 to 493. The value of the gain $g_4$ in each step is determined by values of the resistors 410, 430, 461, 462 and 463.

Figure 3:
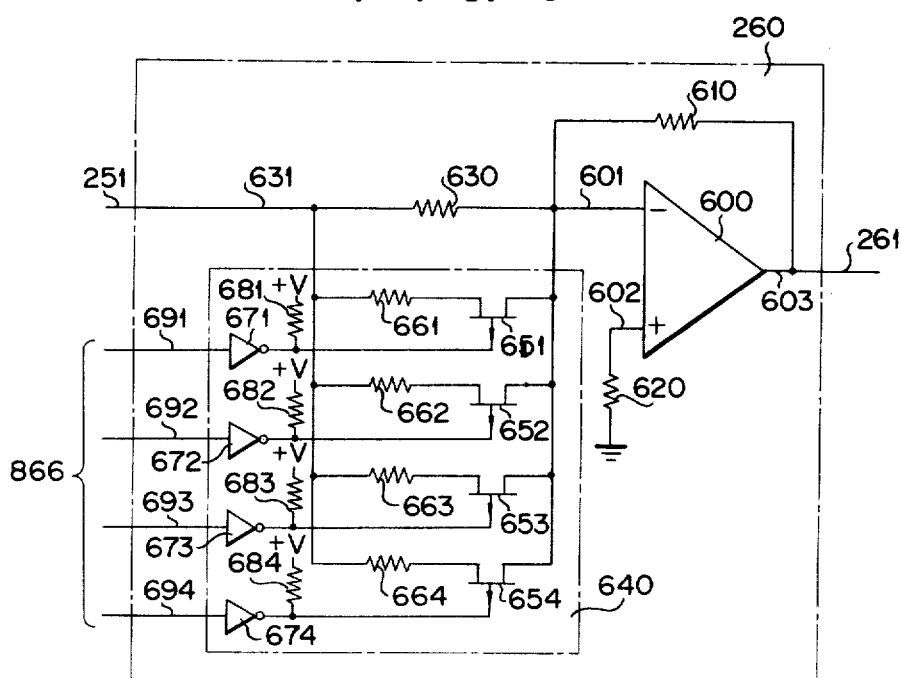
FIG. 3 shows a circuit diagram of a second compensator (variable gain amplifier)

FIG. 3 shows a circuit construction of the second compensator or the variable gain amplifier 260 used in the embodiment. As shown, the amplifier 260 is comprised of an operational amplifier 600, resistors 610, 620, 630 and a gain selector 640.

The operational amplifier 600 is comprised of an inverting input terminal 601, a non-inverting input terminal 602, and an output terminal 603. The output terminal 603 of the operational amplifier 600 also serves as the output terminal 261 of the amplifier 260. The resistor 610 is connected between the output terminal 603 and the inverting input terminal 601. One end of the resistor 620 is connected to the non-inverting input terminal 602 and the other end of it is grounded. One end of the resistor 630 is connected to the inverting input terminal 601. The other end 631 of the resistor 630 serves as the input terminal of the amplifier 260.

The gain selecting circuit 640 is comprised of field effect transistors 651 to 654 and inverters 671 to 674. The drains of the field effect transistors 651 to 654 are commonly connected to the inverting input terminal 601 of the operational amplifier 600. Further, the sources of the field effect transistors 651 to 654 are connected to one end of the resistors 661 to 664, respectively. The other ends of the resistors 661 to 664 are commonly connected to the input terminal 631. The gates of the field effect transistors 651 to 654 are connected to output terminals of the inverters 671 to 674, respectively.

Between the output terminals of the inverters 671 to 674 and the power source are connected pull-up resistors 681 to 684, respectively.

The input terminals 691 to 694 of the inverters 671 to 674 are the gain control terminals of the amplifier 260. The gain $g_6$ of the amplifier 260 constructed as mentioned above varies in 16 steps in accordance with combinations of voltage levels to be applied to the gain control terminals 691 to 694. The value of the gain $g_6$ in each step is determined by values of resistors 610, 630, 661, 662, 663 and 664.

III. Control System (Processor)

Referring again to FIG. 1, the self-compensating device 10 of the present embodiment includes a microprocessor 300. The processor 300 is a programmed data processor for controlling the gains $g_4$ and $g_6$ of the variable gain amplifiers 240 and 260. The processor 300 may also be used to control other devices than the self-compensating device 10, such as a spindle drive device or a performance monitor device. A group of address output terminals 307 of the processor 300 are connected to an address bus 700. A group of data input/output terminals 305 of the processor 300 are connected to a bidirectional data bus 500.

A group of address input terminals 317 of a read only memory (ROM) 310 are coupled with the address bus 700. A group of data output terminals 315 of the ROM 310 are coupled with the data bus 500. Data not requiring rewriting, such as various types of routines or various types of tables, are fixedly stored in the ROM 310. When a specific area in the ROM 310 is accessed, the processor 300 provides corresponding address information to the ROM 310 through the address bus 700. The data stored in the memory area accessed is transferred to the processor 300, through the data bus 500.

A group of address input terminals 327 of a random access memory (RAM) 320 are connected to the address bus 700. A group of input/output terminals 325 of the RAM 320 are coupled with the data bus 500. Various types of data, which must be stored temporarily, are stored in the RAM 320. When a specific area in the RAM 320 is accessed, the processor 300 transfers corresponding address information to the RAM 320 through the address bus 700. When new data is written into the accessed area, the data is transferred from the processor 300 to the RAM 320, by way of the data bus 500. Conversely, when data is read out from the accessed area, the data is transferred from the RAM 320 to the processor 300, via the data bus 500. In order to distinguish the read operation from the write operation, a control signal (not shown) is applied from the processor 300 to the RAM 320.

An interface circuit 330 connected to an input/output bus 331 of a controller (not shown) is coupled with the data bus 500 by means of a group of input/output terminals 335. Various types of commands to control the magnetic disc apparatus are applied to the interface circuit 330 via the input/output bus 331. The processor 300 recognizes the type of the command applied thereto through the data bus 500 to perform the corresponding operation.

A group of address input terminals 387 of a input/output address decoder 380 are coupled with the address bus 700. The output terminals 382, 384, 386 and 388 of the decoder 380 are respectively coupled with control terminals of buffer registers 820, 840, 860 and 880. When address information to make an access to the registers 820, 840, 860 or 880 appears on the address bus 700, a select signal appears at one of the output terminals 382, 384, 386 and 388.

The input terminal of a one-bit input buffer register 820 is coupled with the output terminal 201 of the track detector 200. The register 820 is set every time that the servo transducer 150 passes over the center of the servo track and the track detector 200 produces a track pulse. The output terminal 825 of the register 820 is connected to the data bus 500. When the processor 300 delivers the address information to access the register 820 onto the address line 700, a select signal appears at the output terminal 382 of the input/output address decoder 380. The select signal is transferred to the register 820. Simultaneously, a control signal (not shown) to indicate whether a read-out of the contents of the register 820 is requested or not is applied from the processor 300 to the register 820. When the processor 300 requests the read-out of the contents from the register 820, the contents of the register 820 are transferred to the processor 300 by way of the data bus 500. When the register 820 is accessed, and the processor 300 does not request the read-out of the contents from the register 820, the register 820 is reset.

A group of input terminals 845 of a 3-bit output buffer register 840 are connected to the data bus 500. When the processor 300 accesses the register 840, the output data of the processor 300 is transferred to the register 840 through the data bus 500. A group of the output terminals 844 of the register 840 are respectively connected to the gain control terminals 491 to 493 of the variable gain amplifier 240. Accordingly, the gain $g_4$ of the amplifier 240 is controlled in eight steps in accordance with the bit patterns of the 3-bit gain control data stored in the register 840.

A group of input terminals 865 of a 4-bit output buffer register 860 are connected to the data bus 500. When the processor 300 accesses the register 840, the output data of the processor 300 is transferred to the register 860 through the data bus 500. A group of the output terminals 864 of the register 860 are respectively connected to the gain control terminals 691 to 694 of the variable gain amplifier 260. Accordingly, the gain $g_6$ of the amplifier 260 is controlled in 16 steps in accordance with the bit patterns of the 4-bit gain control data stored in the register 860.

A group of input terminals 885 of an 8-bit output buffer register 880 are connected with the data bus 500. When the processor 300 accesses the register 880, the output data of the processor 300 is transferred to the register 880 via the data bus 500. The 8-bit data stored in the register 880 is called 'target track designation data'. The target track designation data includes a sign bit for indicating if the target track is inside or outside of the transducer 140, and seven numeral bits representing the distance from the transducer 140 to the target track. A group of output terminals 888 of the register 880 are connected to a D/A converter 210. The D/A converter 210 converts the target track designation data stored in the register 880 into a target position signal and products it at the output terminal 211. The voltage $e_1$ of the target position signal is proportional to the target track designation data stored in the register 880. The output terminal 211 of the D/A converter 210 is connected to the velocity command signal generator 220.

The velocity command signal generator 220 responds to the target position signal to determine a proper target velocity and produces a velocity command signal on its output terminal 221. Since the values of the target track designation data stored in the register 880 are discrete, the values of the output voltage $e_1$ of the D/A converter 310 are also discrete. However, since the velocity command signal generator 220 includes a proper wave-shaper, the voltage $e_2$ of the velocity command signal continuously changes. The velocity command signal represents a target velocity. As described above, the velocity command signal, together with the compensated velocity signal is applied to the velocity error detector 250.

A timer 390 produces a clock pulse on its output terminal 391 at given intervals. The clock pulse is applied to the interrupt terminal of the processor 300. When the clock pulse occurs, the processor 300 interrupts the program now being executed and starts the execution of a clock routine stored in the ROM 310. In the course of the execution of the clock routine, the processor 300 accesses the timer area set in the RAM 320 and reads out the clock data stored in the timer area. Then, '1' is added to the clock data, so that the clock data is updated. The updated clock data is loaded again into the timer area. At the end of the execution of the clock routine, the processor 300 restarts the execution of the interrupted program.

IV. Self-Compensating Operation

The self-compensating operation of the self-compensating device as described above will be described hereinafter. The self-compensating operation is performed under control of the processor 300.

Upon turning the power source on, the processor 300 executes an initialize routine fixed stored in a given memory area of the ROM 310. As the execution of the initialize routine progresses, the respective components of the magnetic disc apparatus are sequentially initialized. In the course of the execution of the initialize routine, the RAM 320, and the registers 820, 840, 860 and 880 are all reset. By resetting the registers 840 and 860, the gains $g_4$ and $g_6$ of the amplifiers 240 and 260 are given values, for example, the lowest values.

Then, the carriage 290 is driven and the read/write transducer 140 is positioned at the outermost data track. This operation is called a 'restore operation'. At this stage, the gains of the amplifiers 240 and 260 are not yet adjusted. However, since the operation of the actuator 280 in the restore operation is relatively slow, there is no fear of trouble occurring. When all the components in the magnetic disc apparatus are initialized, the initialize routine is completed.

Following the end of the initialize routine, the execution of the self-compensating routine commences. By a command given from an external device, the execution of the self-compensating routine may also be started at any time. The self-compensating routine, like the initialize routine, is fixedly stored in a given memory area in the ROM 310. FIGS. 4A to 4E show waveforms of the target position signal $e_1$, the velocity command signal $e_2$, the actuator drive current i, the velocity $e_3$ signal and the track, respectively pulses.

Figure 4:
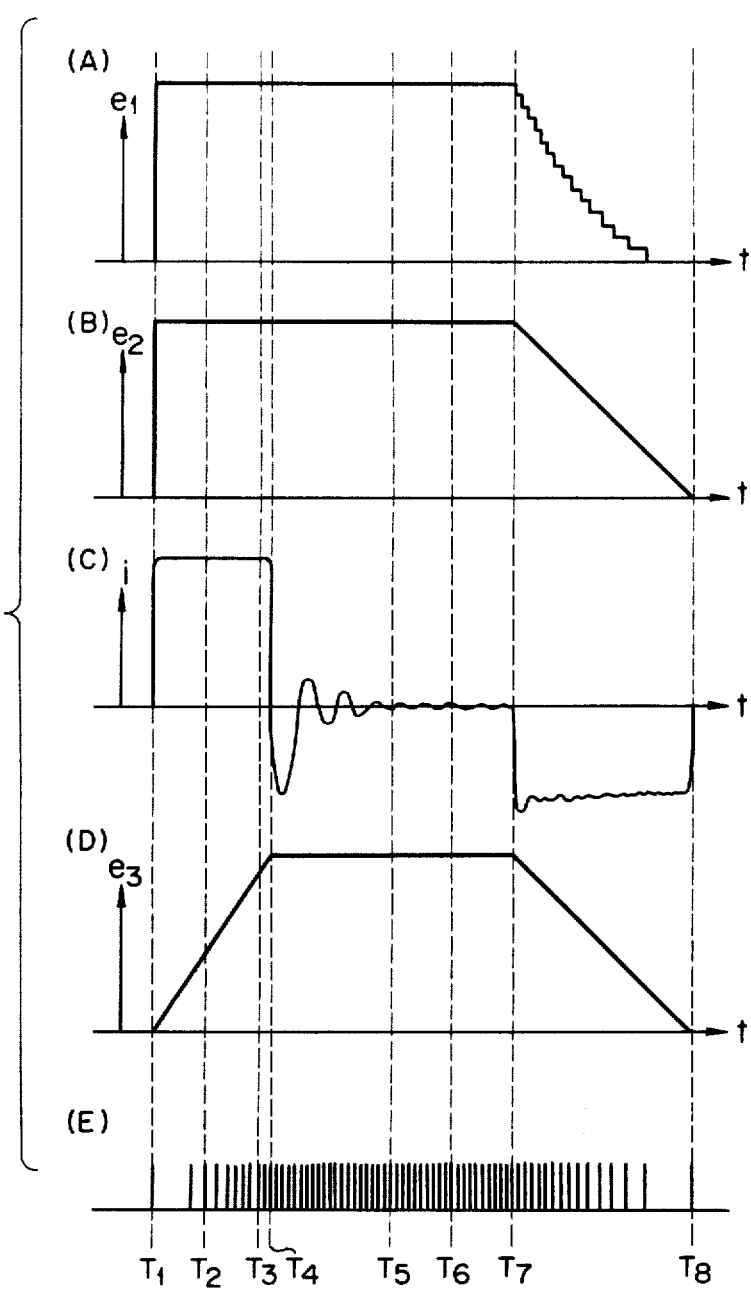
FIGS. 4A to 4E show waveforms of a target position signal, a velocity command signal, an actuator drive current, a velocity signal and track pulses during a period that the self-compensating routine is executed.

Following the start of the self-compensating routine, the processor 300 transfers given target track designation data, for example, '+15' to the register 880. In FIGS. 4A to 4E, this time is designated as $T_1$. Simultaneously with the completion of the transfer, the D/A converter 210 converts the target track designation data stored in the register 880 into a target position signal (FIG. 4A). The velocity command signal generator 220 generates a velocity command signal (FIG. 4B) referring to the target position signal.

Immediately before the velocity command signal generator 220 produces such a velocity command signal, the carriage 290, a read/write transducer 140 and the servo transducer 150 are maintained stationary. At time $T_1$, the velocity error detector 250 detects a difference between a target velocity and a real velocity (zero) to produce a velocity error signal. The velocity error signal is amplified by the amplifier 260 and is converted into an actuator drive current (FIG. 4C) by the power amplifier 270. The actuator 280 accelerates the carriage 290, the read/write transducer 140 and the servo transducer 150 toward the center of the disc 100.

The velocity of the carriage 290 is detected by the velocity detector 230 and is fed back to the velocity error detector 250. Therefore, the acceleration of the carriage 290 continues until the output voltage $e_4$ of the amplifier 240 is equal to the output voltage $e_2$ (FIG. 4B) of the velocity command signal generator 220. During the accelerating period, the voltage $e_5$ of the velocity error signal has a very large value, so that the output current i (FIG. 4C) of the power amplifier 270 is limited to the given value described above. Consequently, the acceleration $\alpha$ of the carriage 290 is fixed, and the velocity signal (FIG. 4D) linearly increases. The value of the acceleration $\alpha$ depends on the current-acceleration coefficient Ki of the actuator 280.

The track detector 200 produces a track pulse (FIG. 4E) every time that the servo transducer 150 crosses a center of the servo track. Upon the occurrence of the track pulse, the register 820 is set. After the target track designation data is transferred to the register 880, the processor 300 periodically checks if the register 820 is set or not. When confirming that the register 820 is set, the processor 300 immediately resets the register 820 and then adds '1' to the track number data stored in the track number memory area of the RAM 320. (At this time, the track number data has been set to '0' by the initialize routine.) Therefore, the track number data is updated every time the servo transducer 150 crosses the center of servo track. Assuming now that track number '0' is assigned for the outermost data track, '1' for the servo track at the inner side of the data track '0', and '2' for the servo track at the inner side of the data track '1', the track number data indicates the track number of the servo track over which the servo transducer 150 passes.

When the track number data reaches a first value, for example, '2', the processor 300 clears the timer area of the RAM 320. In FIGS. 4A to 4E, the time is denoted as $T_2$. As described above, the clock data stored in the timer area, has an addition of '1' every given time interval and is automatically updated, after that.

When the track number data reaches a second value, for example, '8', the processor 300 reads out the clock data from the timer area of the RAM 320. In FIGS. 4A to 4E, this time is denoted as $T_3$. The clock data read out represents the time taken for the servo transducer 150 to travel from the second track to the 8th track. The time is shortened as the value of the current-acceleration converting coefficient Ki of the actuator 280 is increased. In other words, the clock data indirectly indicates the value of the current-acceleration converting coefficient Ki of the actuator 280. Referring to the clock data, the processor 300 produces 4-bit gain control data to make the resultant coefficient ($Ki \cdot G_7 \cdot g_6 \cdot G_5$) closest to a fixed value $K_2$, and then sends it to the register 860. For preparation of the 4-bit gain control data, the first table fixedly stored in the ROM 310 is preferably used.

When the velocity of the carriage 290 increases and the output voltage $e_2$ of the velocity command signal generator 220 is equal to the output voltage $e_4$ of the amplifier 240, the acceleration of the carriage 290 ceases. In FIGS. 4A to 4E, this time is denoted as $T_4$. After time $T_4$, the carriage 290 is moved at a fixed velocity.

When the track number data reaches a third value, for example, '30', the processor 300 again clears the timer area of the RAM 320. In FIGS. 4A to 4E, this time is denoted as $T_5$. Then, when the track number data reaches a fourth value, e.g. '40', the processor 300 reads out the clock data from the timer area. In FIGS. 4A to 4E, this time has the reference character $T_6$. The clock data read out represents the time taken for the servo transducer 150 to travel from the 30th track to the 40th track. The longer this time, the larger the value of the velocity-voltage converting coefficient Kv of the velocity detector 230. Accordingly, the value of the clock data is in proportion to the value of the velocity-voltage converting coefficient Kv of the velocity detector 230. The processor 300 prepares 3-bit gain control data so as to make the value of the above-mentioned resultant coefficient ($G_4 \cdot Kv$) closest to the fixed value $K_1$, with reference to the clock data read out, the transfers the data to the register 840. In preparing the 3-bit gain control data, it is desirable to use the second table fixedly stored in the ROM 310.

When the track number data reaches fifth value, e.g. '50', the processor 300 decreases by '1' the absolute value of the target track designation data stored in the register 880. As a result, the D/A converter 200 produces a target position signal of smaller value, and the velocity command signal generator 220 produces a velocity command signal of smaller value. As a consequence, the carriage 290 starts to be decelerated. In FIGS. 4A to 4E, this time is denoted as $T_7$.

Then, every time the track pulse is produced, the absolute value of the target track designation data is decreased by '1', and the velocity of the carriage 290 is decreased in step with the target track designation data. The carriage 290 stops some time after the value of the target track designation data becomes '0'. In FIGS. 4A to 4E, this time is denoted as $T_8$. After that, the read/write transducer 140 is again positioned at the outermost data track and the self-compensating routine ends. Subsequently, the magnetic disc apparatus starts the usual record/reproduction operation.

In the above-mentioned embodiment, the characteristics of the actuator 280 and the velocity detector 230 are measured by measuring the time for the servo transducer 150 to travel a given distance. Alternately, those characteristics may be measured by measuring a distance which the servo transducer 150 moves for a given time.

As described above, in the present invention, the magnetic disc apparatus per se measures the characteristic of the actuator for positioning the transducer and adjusts the compensator on the basis of the measurement result. Accordingly, the manual adjustment of the compensator, which is required in a conventional compensating device, is not necessary. Further, the self-compensating device may automatically compensate for a change of the characteristic of the actuator arising from the aging of the actuator or the replacement of the actuator, because the self-compensating operation is made each time the power source is turned on.

What we claim is:

1. Self-compensating apparatus for a magnetic disc apparatus comprising:
   (a) magnetic disc means with a number of data tracks and a number of servo tracks, said data tracks being concentrically arranged on a surface of the magnetic disc means and said servo tracks being concentrically arranged on a surface of said magnetic disc means;
   (b) read/write transducer means for reading out data from or writing data into said data tracks;
   (c) servo transducer means for reading out servo data from said servo tracks;
   (d) actuator means for reciprocally moving said read/write and servo transducer means across said data and servo tracks;
   (e) track detector means responsive to an output signal of said servo transducer means to produce a pulse each time said servo transducer means crosses a servo track;
   (f) velocity detecting means which detects the velocity of said servo transducer means to produce a velocity signal;
   (g) velocity error detector means responsive to said velocity signal and a velocity command signal to produce a velocity error signal;
   (h) compensator means responsive to said velocity error signal to produce a compensated velocity error signal, thereby compensating a characteristic of said actuator means;
   (i) drive means responsive to said compensated velocity error signal to accelerate or decelerate said actuator means so as to make compensated velocity error signal small; and
   (j) control means for supplying said velocity command signal, and for adjusting said compensator means responsive to said output pulses of said track detector means and a given velocity command signal.

2. In a magnetic disc apparatus comprising magnetic disc means with a number of data tracks concentrically arranged on a surface thereof, read/write transducer means for reading out data from or writing data into said data tracks, actuator means for reciprocally moving said read/write transducer means across said data tracks, velocity detecting means for detecting the velocity of said transducer means to produce a velocity signal, velocity error detector means responsive to said velocity signal and a velocity command signal to produce a velocity error signal and drive means responsive to said velocity error signal to accelerate or decelerate said actuator means so as to make said velocity error signal small;

self-compensating apparatus for compensating for a characteristic of said actuator means, wherein said velocity error detector means is responsive to said velocity signal and a velocity command signal to produce said velocity error signal, and comprising compensator means responsive to said velocity error signal to produce a compensated velocity error signal, said drive means being responsive to said compensated velocity error signal, means for detecting the position of the transducer means relative to the data tracks, and control means for supplying said velocity command signal, and for adjusting said compensator means responsive to said means for detecting and a given velocity command signal.

3. A self-compensating apparatus according to claim 2, wherein said magnetic disc means includes a number of servo tracks on a surface thereof, said self-compensating apparatus comprising servo transducer means for reading out servo data from said servo tracks, said means for detecting being responsive to an output signal of said servo transducer means to produce a pulse each time said servo transducer means crosses a servo track, said control means being responsive to said output pulses and said given velocity command signal for adjusting said compensator means.

4. A self-compensating apparatus according to claim 1 or 3, wherein said drive means feeds a fixed current to said actuator means during a period in which said compensated velocity error signal exceeds a given value.

5. A self-compensating apparatus according to claim 1 or 3, wherein said control means includes a programmed data processor.

6. A self-compensating apparatus according to claim 1 or 3, wherein said compensator means includes a variable gain amplifier of which the gain is controlled by said control means.

7. A self-compensating apparatus according to claim 6, wherein said control means responsive to said output pulses of said position detector means measures the time taken for said transducer means to move a given distance and adjusts the gain of said variable gain amplifier in accordance with a difference between the measured value and a pregiven value.

8. A self-compensating apparatus according to claim 7, wherein the acceleration of said transducer means is kept substantially at a fixed value during passage of said transducer means over said given distance.

9. A self-compensating apparatus according to claim 6, wherein said control means adjusts the gain of said variable gain amplifier each time power is supplied to said magnetic disc apparatus.

* * * * *